Figure 1:
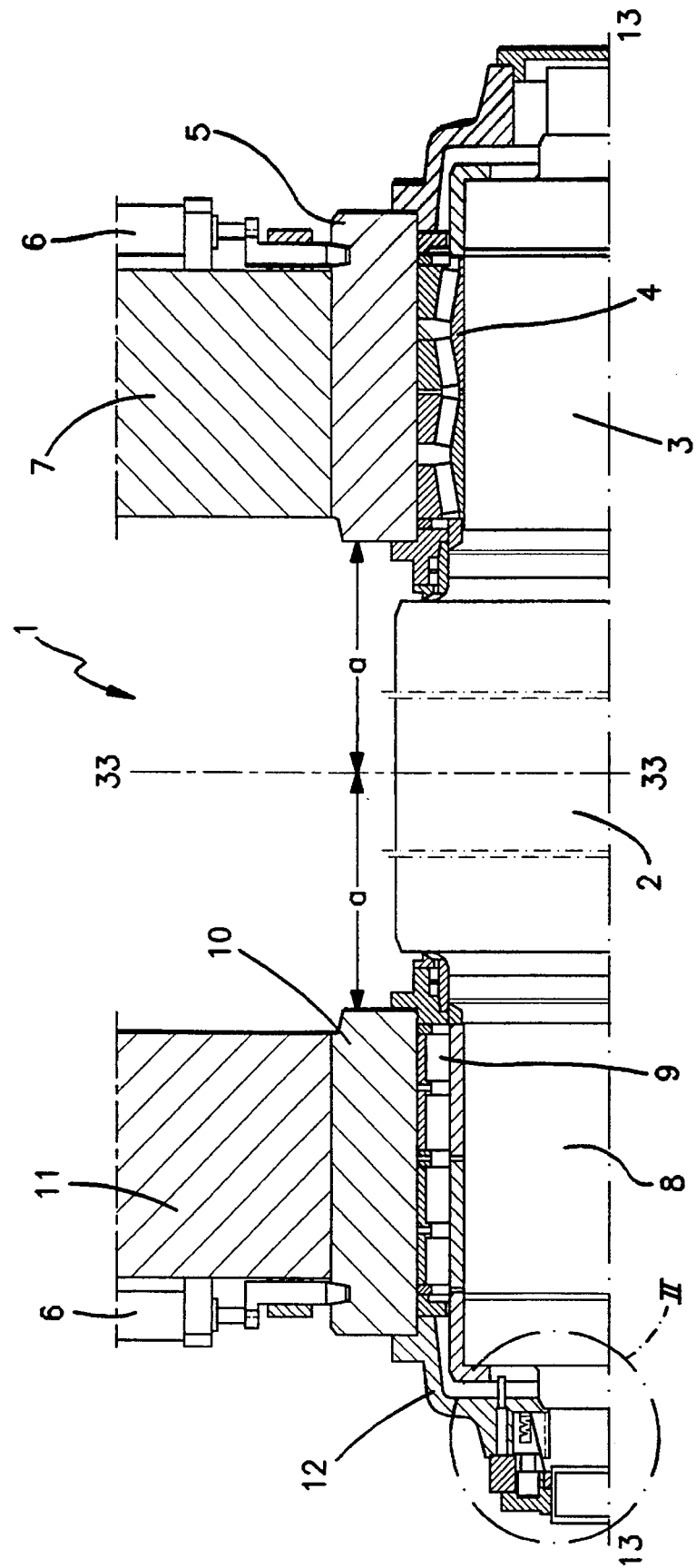

United States Patent [19]
Moritz et al.

[11] Patent Number: 5,600,987
[45] Date of Patent: Feb. 11, 1997

[54] DEVICE FOR POSITIONING AND LOCKING A CHOCK ON A ROLL PIN DURING INSTALLATION OF A SET OF ROLLS IN OR REMOVAL FROM A ROLL STAND

[75] Inventors: Werner Moritz; Axel Barten, both of Siegen, Germany

[73] Assignee: Achenbach Buschhutten GmbH, Kreuztal, Germany

[21] Appl. No.: 319,100

[22] Filed: Oct. 6, 1994

[30] Foreign Application Priority Data

Oct. 6, 1993 [DE] Germany .......................... 43 34 021.0

[51] Int. Cl.⁶ .................................................. B21B 31/08
[52] U.S. Cl. .................................................. 72/238; 384/556
[58] Field of Search ............................ 72/237, 238, 239, 72/245, 247; 384/256, 418, 556, 583, 620

[56] References Cited

U.S. PATENT DOCUMENTS

| | | | |
|---|---|---|---|
| 3,479,854 | 11/1969 | Stubbs | 72/245 |
| 4,202,192 | 5/1980 | Haneda et al. | 72/247 |
| 4,211,101 | 7/1980 | Krylov et al. | 72/247 |
| 4,589,269 | 5/1986 | Michaux | 72/237 |
| 4,938,615 | 7/1990 | Baker | 29/895.2 |
| 5,029,461 | 7/1991 | Lawrence et al. | 72/238 |

FOREIGN PATENT DOCUMENTS 120128  6/1976  Germany .

OTHER PUBLICATIONS

By E. Benfer, "Morgoil–Walzenzapfenlager", VDI–Bericht, 1985, No. 549, pp. 1–11.

*Primary Examiner*—Lowell A. Larson
*Assistant Examiner*—Thomas C. Schoeffler
*Attorney, Agent, or Firm*—Young & Thompson

[57] ABSTRACT

A rolling mill has a rolling stand having two roll standards for supporting rolls having roll pins at opposite ends of each roll with bearings interposed between the standards and the pins. A chock (10) surrounds each bearing and is releasably secured within a standard. A housing (12) is detachably secured on an outer side of the chock. The housing carries stop elements (14) mounted for movement in a direction parallel to the axis (13—13) of the roll. A first hydraulic jack (16) advances the stop elements toward a midplane (33—33) of the roll and into abutment with the roll, thereby to position the housing correctly along the roll axis. A plurality of clamping elements (21) is spaced apart about an endwise outer part (34) of the roll pin (8). A second hydraulic jack (25) moves the clamping elements into clamping engagement with the outer section (34) of the roll pin (8). A coil compression spring (29) releases the clamping elements when the second jack is released and a leaf spring (24) moves the clamping elements out of engagement with the outer section (34) of the roll pin (8). Another coil compression spring (17) retracts the stop elements (14) from engagement with the roll pin (8) when the first jack (16) is deactivated.

5 Claims, 3 Drawing Sheets

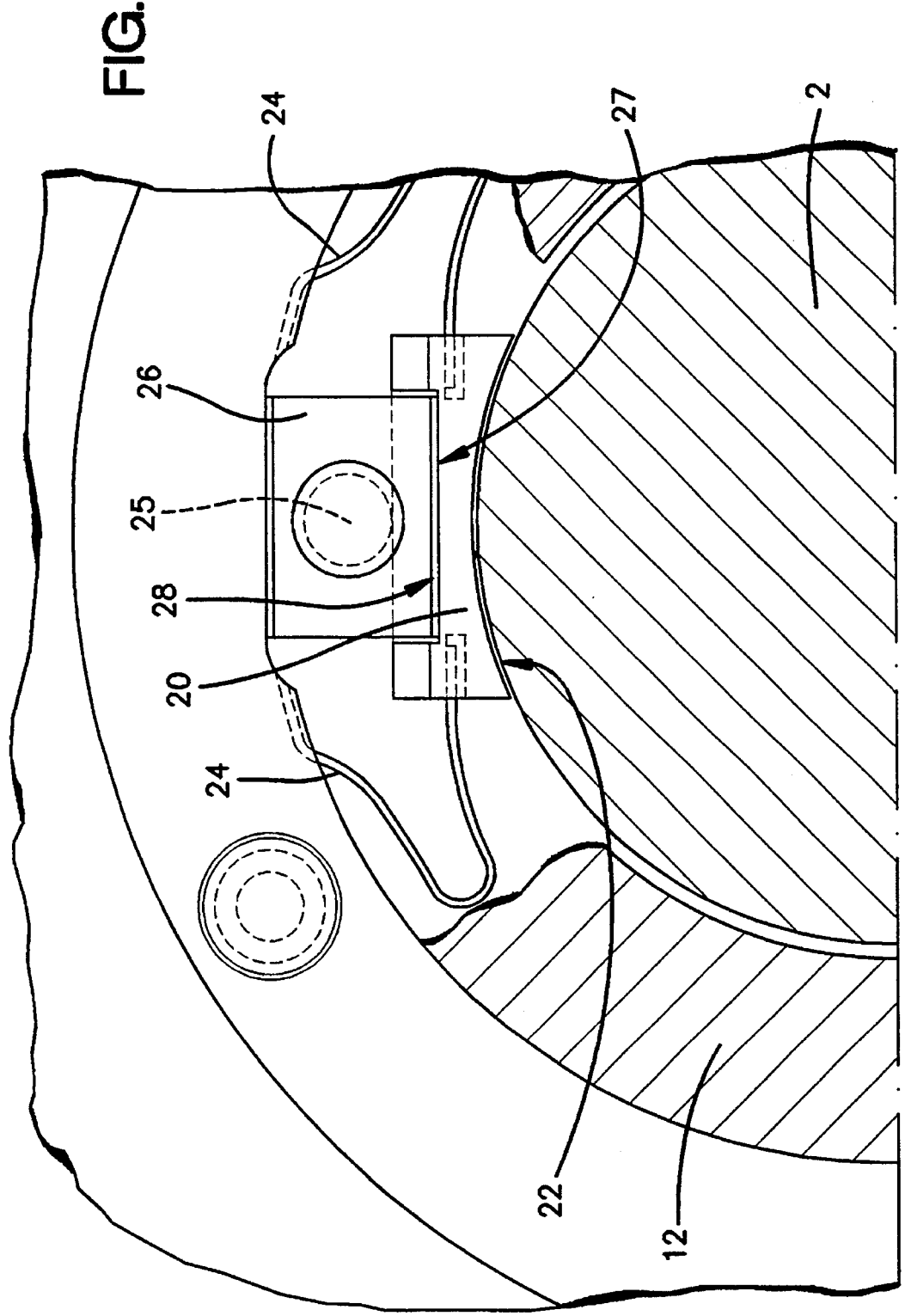

DEVICE FOR POSITIONING AND LOCKING A CHOCK ON A ROLL PIN DURING INSTALLATION OF A SET OF ROLLS IN OR REMOVAL FROM A ROLL STAND

The invention relates to a device for positioning and locking a chock that can be locked with a roll standard of a roll standard on the roll pin or pins rotatably mounted with a floating bearing in a chock or two chocks during installation of a roll of a set of rolls, rotatably mounted with a locating bearing and a floating bearing or two floating bearings in the two standards of the roll stand of a rolling mill, e.g., a back-up roll of a four-high rolling stand, as well as for locking the chock with the roll pin during removal of the roll.

During installation of a set of rolls in a roll stand, the flawless rolling of thin and foil strip requires an exact positioning of the two chocks of a roll, which accommodate the roll pins and the roller bearings and by which the adjustable screw-down forces for producing the rolling force in the roll are introduced, to the center of the roll, and a maintaining of the adjusted position of the chocks in the case of rolling operation, in which the roll undergoes an elongation under the effect of heat. Further, the chocks must be held securely on the rolls during removal of a set of rolls.

The connecting rods or crosspieces previously installed between the chocks of a roll meet these requirements only partially, especially if only one connecting rod or cross-piece is provided. Further, installation and disengaging of the connecting rods are expensive, and the passage section between the two standards of a roll stand is limited by the connecting rods.

The object of the invention is to develop a generic device for positioning and locking a chock on a roll pin during installation of a set of rolls in or removal from a roll stand, which optimally meets the previously described requirements.

The positioning and locking device for roll chocks according to the invention is distinguished by a simple design and is easy to use. Equipping new rolling mills and retrofitting rolling mills already in operation with the positioning device causes no difficulties whatsoever. The method of operation of the device according to the invention makes possible an exact positioning of the chocks on the roll pin, allows a heat expansion of the rolls in rolling operation and assures a secure locking of the positioned chocks with the roll pins during installation of a set of rolls in a roll stand and a locking of the chocks with the pins of a roll lengthened by thermal expansion during removal of a set of rolls.

Figure 2:
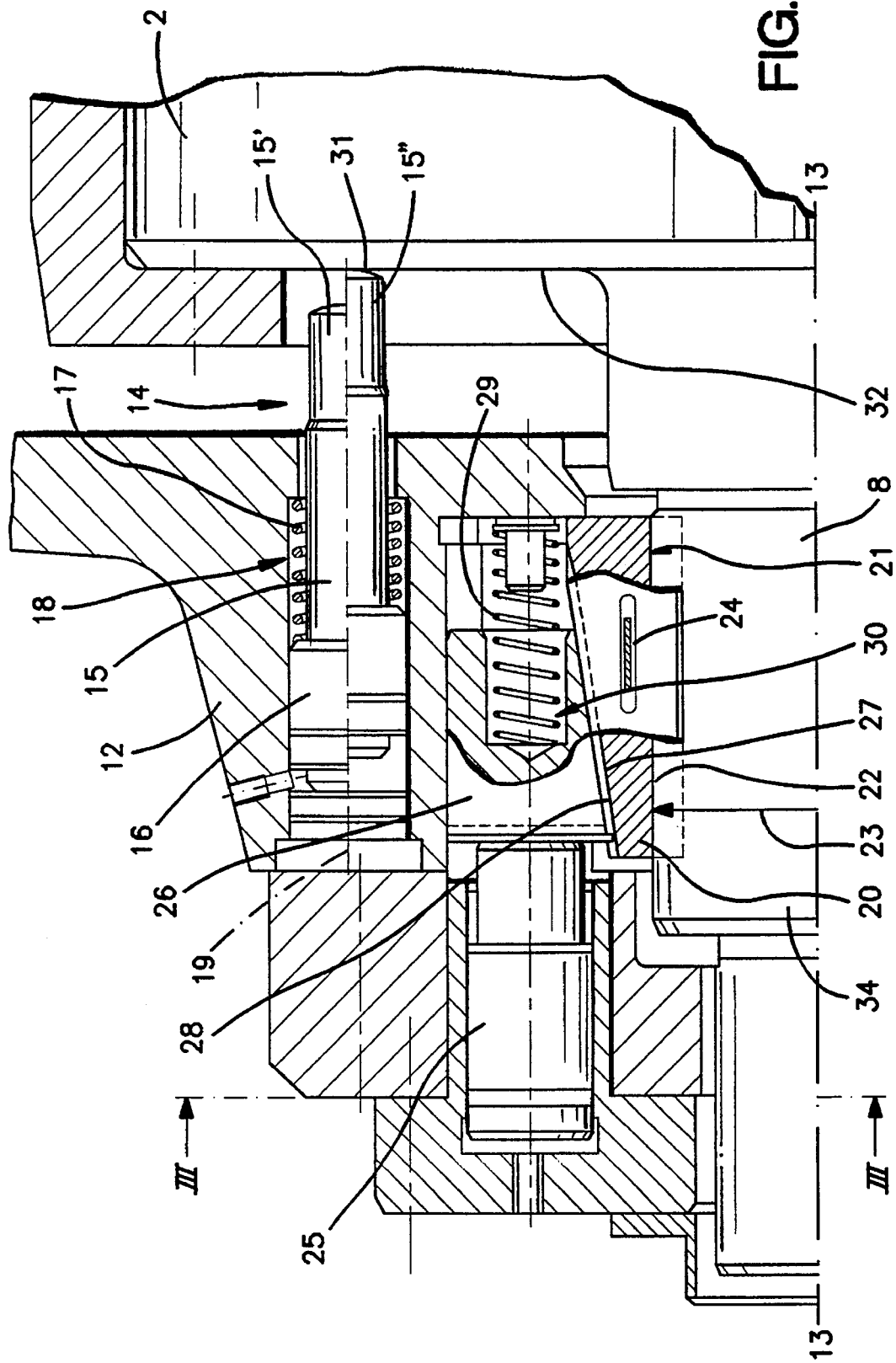

The invention is explained below based on drawings. There is shown in:

FIG. 1 is a semi-longitudinal section of the upper back-up roll of a four-high rolling stand, FIG. 2 is the new positioning and locking device shown within the phantom-line circle II of FIG. 1 in enlarged representation and FIG. 3 is a section along line III—111 of FIG. 2.

Four-high rolling stand 1 according to FIG. 1 is equipped with a set of rolls, which comprises an upper back-up roll 2 of which half has been represented, an upper and a lower working roll, not represented, as well as a lower back-up roll, also not represented.

On the drive side of roll stand 1, back-up roll 2 is mounted rotatably with one roll pin 3 by means of a locating bearing 4 designed as a tapered roller bearing in a chock 5, which is connected in a detachable manner by a lock 6 with one standard 7 of roll stand 1.

On the removal side of roll stand 1, back-up roll 2 is mounted rotatably with the other roll pin 8 by means of a floating bearing 9 designed as a cylindrical roller bearing in a second chock 10, which is connected in a detachable manner by a lock 6 with the other standard 11 of roll stand 1.

A housing 12 is bolted to the outside of chock 10 with floating bearing 9 of back-up roll 2, a housing in which three stop elements 14, adjustable by a drive parallel to roll axis 13—13, are installed. Stop elements 14 are designed as stop pins 15 with a hydraulic cylinder drive 16 to advance pins 15 into a front positioning position 15" and a compression spring 17 as a restoring element 18 to hold pins 15 in a rear position 15' in rolling operation and during roll removal.

The three stop pins 15 are arranged equally spaced on the periphery of a fictitious cylinder 19 coaxial to roll axis 13—13.

Further, two or more clamping elements 21 designed as clamping jaws 20 are installed in housing 12, elements which are arranged offset relative to one another with the same spacing on the periphery of roll pin 8.

Two clamping jaws 20 comprise a cylinder-segment-shaped clamping surface 22 with a radius corresponding to radius 23 of roll pin 8 and are held with two leaf springs 24 in a freewheel position exposing roll pin 8 in rolling operation in housing 12 bolted to chock 10.

To actuate clamping jaws 20, a wedge drive with a hydraulic cylinder 25 is used to displace a pressure element 26, movable parallel to roll axis 13—13, with a wedge surface 27, which interacts with a corresponding counter-wedge surface 28 on the outside of clamping jaw 20 to press it radially against roll pin 8. In rolling operation, clamping jaw 20 is detached by a restoring element 30 designed as compression spring 29, which acts on pressure element 26.

Before the installation of a set of rolls in four-high rolling stand 1, drive-side chock 5 with locating bearing 4 is mounted firmly to roll pin 3 of upper back-up roll 2 at a certain distance a to the center of roll 33—33. By actuating hydraulic cylinders 16, three stop pins 15 in housing 12 fastened to removal-side chock 10 are advanced into positioning position 15" determined by the lift of cylinders 16. Hydraulic cylinders 25 for actuating two clamping jaws 20 are relieved from pressure so that pressure elements 26 are pushed back by restoring springs 29 and as a result, clamping jaws 20 are released, which are raised radially outward by leaf springs 24 from outer section 34 of roll pin 8 into the ventilation position. Now, chock 10 is pushed on roll pin 8 with floating bearing 9, until stop pins 15 with their front, convex-ground end 31 abut a shoulder 32 of roll pin 8, and thus removal-side chock 10 is positioned at the same distance a as drive-side chock 5 from the centerline 33—33 of roll 2. By pressurization of hydraulic cylinders 25, removal-side chock 10 is locked by two clamping jaws 20 engaging on outer pin section 34 of roll pin 8. After subsequent relieving of hydraulic cylinders 16, stop pins 15 are moved by restoring springs 17 into rear position 15'.

In the same way, the lower back-up roll, not represented, is prepared for the installation in roll stand 1.

Now the set of rolls with the two working rolls and the two back-up rolls is moved into standards 7, 11 of four-high rolling stand 1, in which the pressure in hydraulic cylinders 25 to actuate clamping jaws 20 is maintained, e.g., by non-return valves in the feed pipes to the cylinders. Two chocks 5, 10 of upper back-up roll 2 and the chocks of the lower back-up roll are tightly connected by locks 6 with roll standards 7, 11. Before commencing the rolling operation, clamping jaws 20 are detached by pressure relief of hydraulic cylinders 25 from outer section 34 of removal-side roll pin 8 of upper back-up roll 2 and also of the lower back-up roll, so that the rolls rotate freely during the rolling operation and can freely expand with heating in the direction of roll axis 13—13 thanks to floating bearing 9 in removal-side roll standard 11.

When removing the set of rolls for refinishing the rolls, for a roll replacement, for replacing the roller bearings in the chocks and for similar overhaul and repair work, removal-side chock 10, by pressurization of hydraulic cylinders 25, is locked by clamping jaws 20 with roll pin 8 of upper back-up roll 2 lengthened by thermal expansion. The lower back-up roll is prepared for the removal in the same way. Then, locks 6 between standards 7, 11 of roll stand 1 and two chocks 5, 10 of upper back-up roll 2 are detached, and also the chocks of the lower back-up roll are unlocked from the roll standards, and then the set of rolls is moved out from roll stand 1, and the pressure necessary for drive cylinders 25 of clamping jaws 20 is maintained by a non-return valve in the cylinder feed pipes or the like.

In the case of roller bearings with two floating bearings, two positioning devices of previously described design are correspondingly installed.

We claim:

1. In a rolling mill having a rolling stand having two roll standards for supporting a roll having a roll pin at each end of said roll with an axially floating bearing interposed between a said standard and a said roll pin, and a chock surrounding said axially floating bearing and releasably secured within said standard; the improvement comprising a housing detachably secured on an outer side of said chock, said housing carrying stop elements (14) mounted for movement in a direction parallel to an axis (13—13) of said roll, first power means (16) to advance said stop elements toward a midplane (33—33) of the roll and into abutment with the roll, thereby to position said housing correctly along said axis, a plurality of clamping elements (21) spaced apart about an endwise outer part (34) of said roll pin (8), second power means (25) to move said clamping elements into clamping engagement with said outer part (34) of said roll pin (8), means for releasing said clamping elements when said second power means are released and for moving said clamping elements out of engagement with said outer part (34) of said roll pin (8), and means for retracting said stop elements (14) from engagement with said roll pin (8) when said first power means (16) is deactivated.

2. A device according to claim 1, wherein said first power means (16) is a hydraulic cylinder drive and said stop elements are stop pins (15), while said retracting means (18) comprises a coil compression spring surrounding each of said stop pins (15).

3. A device according to claim 2, wherein said stop pins (15) are equally spaced apart about said axis (13—13) in a circular array and are parallel to said axis (13—13).

4. A device as claimed in claim 1, wherein said clamping elements (21) are clamping jaws (20) having part-cylindrical clamping surfaces (22) with a radius the same as that of said outer part (34) of the roll pin (8) and are urged by leaf springs (24) away from said roll pin outer part (34), said second power means comprise a hydraulic cylinder (25) for pressing a pressure member (26) in a direction parallel to said axis (13—13) with a wedge surface (27) which urges a said clamping jaw (20) radially inwardly against said roll pin outer part (34), and said releasing means comprises a coil compression spring (29) acting on said pressure member (26) in a direction opposite said hydraulic cylinder (25).

5. A device according to claim 4, wherein said clamping jaws (20) are spaced apart equal distances about the periphery of said roll pin outer part (34).

* * * * *